(12) United States Patent
Mednik et al.

(10) Patent No.: US 7,561,452 B2
(45) Date of Patent: Jul. 14, 2009

(54) TRANSFORMER-ISOLATED FLYBACK CONVERTERS AND METHODS FOR REGULATING OUTPUT CURRENT THEREOF

(75) Inventors: Alexander Mednik, Campbell, CA (US); Rohit Tirumala, Madison, WI (US); Zhibo Tao, Sunnyvale, CA (US)

(73) Assignee: Supertex, Inc., Sunnyvale, CA (US)

( * ) Notice: Subject to any disclaimer, the term of this patent is extended or adjusted under 35 U.S.C. 154(b) by 276 days.

(21) Appl. No.: 11/557,258

(22) Filed: Nov. 7, 2006

(65) Prior Publication Data

US 2007/0121349 A1 May 31, 2007

Related U.S. Application Data

(60) Provisional application No. 60/740,135, filed on Nov. 28, 2005.

(51) Int. Cl.
  *H02M 3/335* (2006.01)
(52) U.S. Cl. ........................ 363/97; 363/21.12
(58) Field of Classification Search .............. 363/21.01, 363/21.04, 21.05, 21.08, 21.12, 21.13, 21.16, 363/97
  See application file for complete search history.

(56) References Cited

U.S. PATENT DOCUMENTS

| | | | | |
|---|---|---|---|---|
| 4,402,039 A | * | 8/1983 | Jirka | 363/21 |
| 4,920,472 A | * | 4/1990 | Handler | 363/95 |
| 5,305,192 A | * | 4/1994 | Bronte et al. | 363/21 |
| 6,343,026 B1 | * | 1/2002 | Perry | 363/65 |
| 6,434,021 B1 | * | 8/2002 | Collmeyer et al. | 363/21.01 |
| 6,583,994 B2 | * | 6/2003 | Clayton et al. | 363/21.18 |
| 7,016,204 B2 | * | 3/2006 | Yang et al. | 363/21.13 |

* cited by examiner

*Primary Examiner*—Jeffrey L Sterrett
(74) *Attorney, Agent, or Firm*—Jeffrey D. Moy; Weiss & May, P.C.

(57) ABSTRACT

A system and method for delivering regulated power and current to an output load has a flyback transformer having a primary winding and a secondary winding. The secondary winding delivers stored energy to the output load. An oscillator circuit is provided for generating a periodical signal. A switching circuit is coupled to the flyback transformer and the oscillator circuit for energizing the primary winding to a reference current level each cycle of the oscillator circuit. The oscillator circuit has an integrator for deriving a time integral of a voltage at the primary winding. The oscillator circuit has a peak detector coupled to the integrator for holding a peak value of the time integral. The oscillator circuit further has a ramp generator for producing a ramp signal. A comparator is provided for comparing the peak value with the ramp signal and generating the periodical signal whenever the ramp signal exceeds the peak value.

20 Claims, 4 Drawing Sheets

TRANSFORMER-ISOLATED FLYBACK CONVERTERS AND METHODS FOR REGULATING OUTPUT CURRENT THEREOF

RELATED APPLICATION

This application is related to U.S. Provisional Application Ser. No. 60/740,135, filed Nov. 28, 2005, and entitled, "TRANSFORMER-ISOLATED FLYBACK CONVERTERS AND METHODS FOR REGULATING OUTPUT CURRENT THEREOF". The present patent application claims the benefit under 35 U.S.C. §119(e).

FIELD OF THE INVENTION

The present invention relates generally to power supplies, and, more specifically, to switching power converters including an isolation power transformer of the flyback type, and even more specifically to a method and apparatus for controlling output current of a switching power converter by monitoring voltage at the primary winding of the transformer.

BACKGROUND OF THE INVENTION

Electronic devices typically incorporate low voltage DC power supplies to operate internal circuitry by providing a constant output voltage or current from a wide variety of input sources. Switching power converters are in common use to provide a voltage-regulated source of power, from battery, AC line and other sources.

Power converters operating from an AC line source (offline converters) typically require isolation between input and output in order to provide for the safety of users of electronic equipment in which the power supply is included or to which the power supply is connected. Transformer-coupled switching power converters are typically employed for this function. Regulation in a transformer-coupled power converter is typically provided by an isolated feedback path that couples a sensed representation of an output voltage from the output of the power converter to the primary side, where an input voltage (rectified line voltage for AC offline converters) is typically switched through a primary-side transformer winding by a pulse-width-modulator (PWM) controlled switch. The duty ratio of the switch is controlled in conformity with the sensed output voltage or current, providing regulation of the power converter output.

The isolated feedback signal provided from the secondary side of an offline converter is typically coupled to the primary side by an optoisolator or other circuit such as a signal transformer and a chopper circuit. The feedback circuit typically raises the cost and size of a power converter significantly and also lowers reliability and long-term stability, as opto-couplers change characteristics with age.

An alternative approach is often used for driving relatively static loads (light emitting diodes (LED), battery chargers). This approach uses an inherent property of a switching converter of a flyback type to deliver constant output power when operating in a discontinuous conduction mode (DCM). FIG. 1 depicts an example of such prior art transformer isolated LED driver circuit operating in the constant-power mode. The circuit includes an input voltage source 101, a flyback transformer 103 having a primary winding 111 and a secondary winding 112, a secondary rectifier diode 105, a smoothing capacitor 106, a switching transistor 102, a current sense resistor 104, a comparator 108 and a flip-flop circuit 109. In operation, a constant frequency CLOCK signal sets the flip-flop circuit 109. The transistor 102 periodically connects the primary winding 111 across the input voltage source 101. Comparator 108 monitors the current in the winding 111 by sensing voltage at the current sense resistor 104 and comparing it to a reference level REF. The comparator 108 resets the flip-flop 109 when the voltage at the resistor 104 exceeds REF. The transistor 102 turns off. The diode 105 conducts current from the secondary winding 112 to the LED load 107 and the smoothing capacitor 106. The diode 105 becomes reverse biased when the energy stored in the transformer 103 depletes fully and the current in the winding 112 reaches zero. Since the stored energy is proportional to the square of the current in the transformer 103 windings whose peak value is maintained constant, the circuit delivers constant power to the output load 107. For the same reason, the output power is also directly proportional to the CLOCK frequency. The output current of the flyback converter of FIG. 1 can be considered constant in the case of a fixed load. Therefore, this circuit could be used for supplying constant current output without the need for an opto-coupler feedback.

However, the circuit of FIG. 1 suffers some serious drawbacks. Firstly, the output current of this circuit is affected by variation in control circuit and load characteristics that are difficult to account for. The output current variation is caused by the inductance tolerances, switching frequency variation, tolerances and temperature drifting of the output load characteristics. Note that each 1% of the peak current error translates into a 2% output current error due to the quadratic output power dependence. A practical output current accuracy of a constant-power converter of FIG. 1 could be as poor as +/−50% or worse. Secondly, a constant-power converter must be tailored to a specific load and cannot be used as a universal constant current source. And thirdly, a constant-power converter is unprotected against output open-and short-circuit conditions. Indeed, the open-circuit output voltage and the short-circuit output current become uncontrollably high with the circuit of FIG. 1.

A simple circuit and method in accordance with the embodiments of the present invention yield a true universal constant-current source that is free of the above drawbacks.

Therefore, a need exists to provide a device and method to overcome the above problems.

SUMMARY OF THE INVENTION

Switching power converters for delivering regulated power and regulated current to an output load include a flyback transformer having a primary winding and a secondary winding. The secondary winding delivers stored energy to the output load. An oscillator circuit is provided for generating a periodical signal. A switching circuit is coupled to the flyback transformer for energizing the primary winding to a reference current level each cycle of the oscillator circuit. The oscillator circuit has an integrator for deriving a time integral of a voltage at the primary winding. The oscillator circuit has a peak detector coupled to the integrator for holding a peak value of the time integral. The oscillator circuit further has a ramp generator for producing a ramp signal. A comparator is provided for comparing the peak value with the ramp signal and generating the periodical signal whenever the ramp signal exceeds the peak value.

Methods for regulating output power and output current in a switching power converter comprising a magnetic element and a switching circuit, the magnetic element having a primary winding, a secondary winding and a sense winding, the switching circuit alternately connecting the primary windings for receiving electric energy from an input voltage source and the secondary windings for delivering the electric energy to a load, include: taking an integral of voltage at the sense winding while the magnetic element is receiving electric energy from the input voltage source; deriving a peak value of the integral; controlling switching frequency inverse proportionally to the peak value of the integral; sampling reflected output voltage at the sense winding while the magnetic element is delivering electric energy to the output load; controlling switching frequency of the switching circuit proportionally to the reflected output voltage; and initializing the integral with an initial level each switching cycle of said switching circuit.

The present invention is best understood by reference to the following detailed description when read in conjunction with the accompanying drawings.

DETAILED DESCRIPTION OF THE EMBODIMENTS

The present invention provides novel circuits and methods for controlling output current of a switching power supply. As a result, accuracy of a switching power converter can be improved and reduction in the component count can be achieved by incorporating one or more aspects of the present invention. The present invention includes, alone or in combination, a unique oscillator circuit whose switching frequency is independent of the timing and power component variation and adaptive to varying output load.

Figure 1:
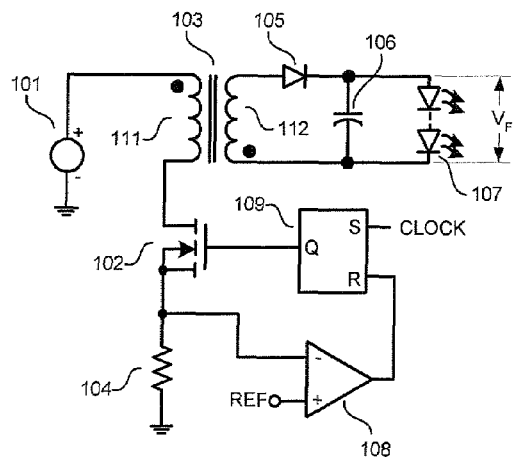
FIG. 1 depicts of a prior-art constant-power flyback converter.
Figure 2:
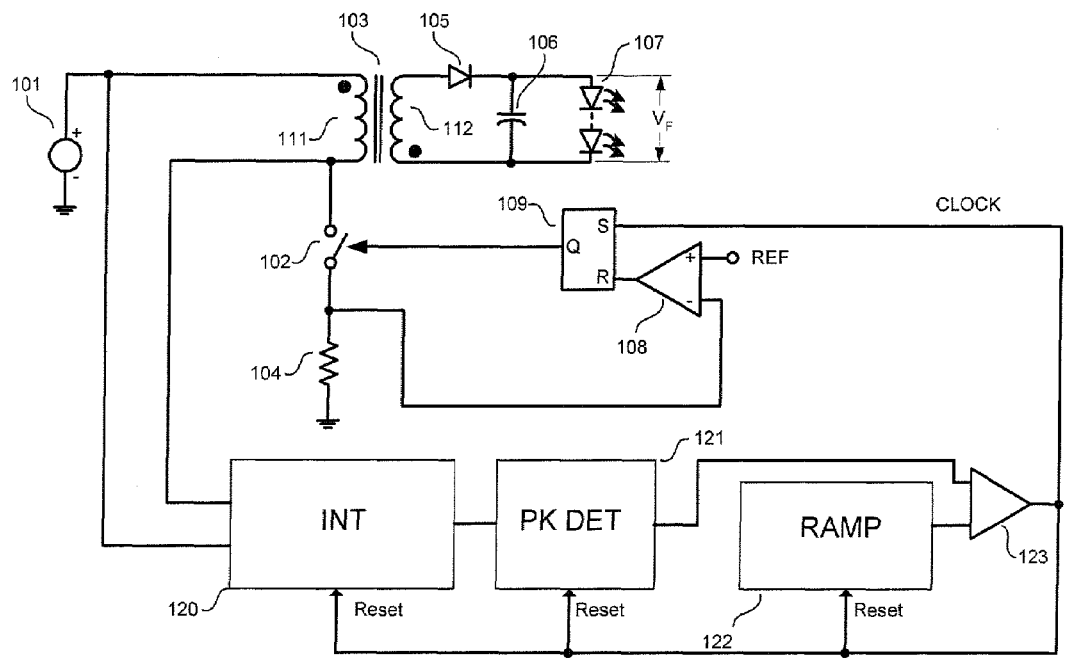
FIG. 2 shows a constant-power flyback converter of the present invention.

FIG. 2 shows a simplified block diagram of the first embodiment of the present invention. The depicted circuit is a flyback converter delivering constant power output to an output LED load. The circuit includes an input voltage source 101, a flyback transformer 103 having a primary winding 111 and a secondary winding 112, a secondary rectifier diode 105, a smoothing capacitor 106, a controlled power switch 102, a current sense resistor 104, a comparator 108, a flip-flop circuit 109, an integrator circuit 120, a peak detector 121, a ramp generator 122 and a comparator 123. Operation of the circuit of FIG. 2 is identical to one of the circuit of FIG. 1 with the exception of the CLOCK signal. The integrator circuit 120 generates a ramp signal whose slew rate is proportional to the voltage across the primary winding 111. The peak detector 121 tracks this ramp while the switch 102 is in conduction. The peak detector 121 holds the peak level of the ramp following the turn-off of the switch 102. The comparator 123 compares the output of the peak detector 121 to the ramp signal 122 and outputs the CLOCK signal when the ramp signal 122 exceeds the output of the peak detector 121. The integrator 120, the peak detector 121 and the ramp generator 122 reset to zero (or some common arbitrary level) upon receiving the CLOCK signal. (The integrator 120 can be reset at any time during the holding state of the peak detector 121.) The resulting CLOCK frequency is a function of a ratio of the integrator 120 and ramp generator 122 slew rates rather than their absolute values. Hence the variation of the CLOCK frequency can be minimized by close matching the circuits 120 and 122, and the circuit of FIG. 2 is suitable for use in an integrated circuit (IC) design. It can also be shown that the output power of the circuit of FIG. 2 is independent of the inductance of the transformer 103. Thus, the circuit of FIG. 2 overcomes the accuracy deficiencies of a conventional prior-art constant-power flyback converter.

Figure 3:
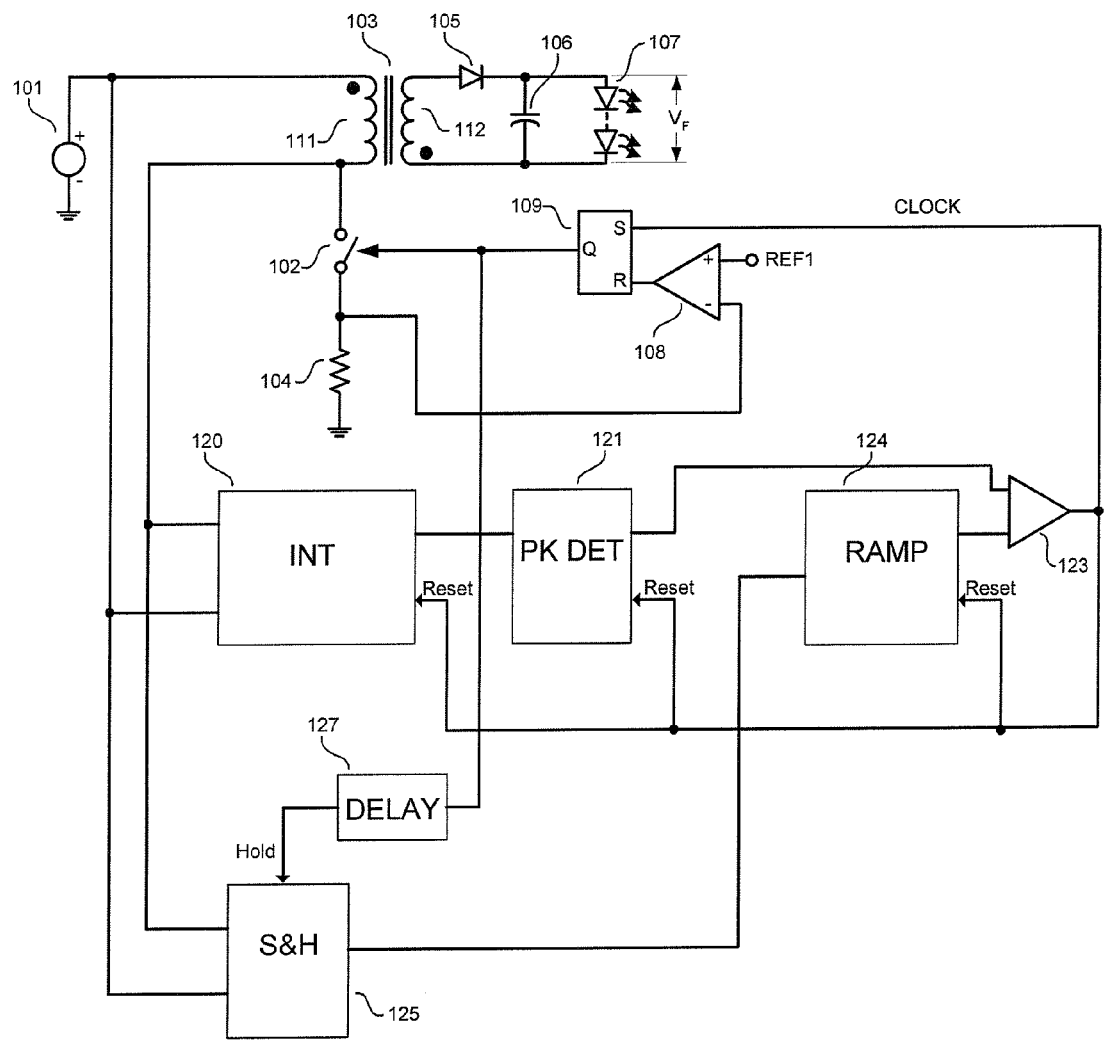
FIG. 3 shows a constant-current flyback converter of the present invention using sensing of reflected output voltage.

FIG. 3 depicts another embodiment of the present invention. A flyback converter is shown wherein the voltage across the primary winding 111 is monitored for the purpose of regulating constant output current in the LED load 107 (as opposed to the constant output power). The circuit includes an input voltage source 101, a flyback transformer 103 having a primary winding 111 and a secondary winding 112, a secondary rectifier diode 105, a smoothing capacitor 106, a controlled power switch 102, a current sense resistor 104, first comparator 108, a flip-flop circuit 109, an integrator circuit 120, a peak detector 121, a ramp generator 124, second comparator 123, a sample-and-hold (S & H) circuit 125 and a blanking delay circuit 127.

In operation of the circuit of FIG. 3, a variable frequency CLOCK signal sets the flip-flop circuit 109. The CLOCK frequency is made proportional to the voltage at the transformer winding 111 at a given moment during the conduction time of the diode 105. At this moment, the voltage at the winding 111 is proportional to the voltage drop at the output LED load 107 and the diode 105. The moment is delayed by the blanking circuit 127 with respect to the turn-off transition of the switch 102 to avoid sampling errors due to parasitic ringing of the voltage at the winding 111. The switch 102 periodically connects the primary winding 111 across the input voltage source 101. Comparator 108 monitors the current in the winding 111 by sensing voltage at the current sense resistor 104 and comparing it to a reference level REF1. The comparator 108 resets the flip-flop 109 when the voltage at the resistor 104 exceeds REF1. The switch 102 turns off. The diode 105 conducts current from the secondary winding 112 to the LED load 107 and the smoothing capacitor 106. The diode 105 becomes reverse biased when the energy stored in the transformer 103 depletes fully and the current in the winding 112 reaches zero. The integrator circuit 120 generates a ramp signal whose slew rate is proportional to the voltage across the primary winding 111. The peak detector 121 tracks this ramp while the switch 102 is in conduction. Following the turn-off of the switch 102, the peak detector 121 holds the peak level of the ramp, and the blanking delay circuit 127 is triggered. The S & H circuit 125 samples the voltage at the primary winding 111 after the blanking delay 127. The output of the S & H circuit 125 determines the slew rate of the ramp signal 124. Hence the slew rate is proportional to the voltage drop at the output LED load 107 and the diode 105. The comparator 123 compares the output of the S & H circuit 125 to the output ramp signal of the generator 124 and generates the CLOCK signal when the ramp signal exceeds the output of the S & H circuit 125. The integrator 120, the peak detector 121 and the ramp generator 122 are reset to zero (or some common arbitrary level) each switching cycle. Similarly to the previous circuit of FIG. 2, the resulting CLOCK frequency is independent of the absolute values of the ramp slew rates. The frequency is rather dependent on their ratio. Hence the variation of the CLOCK frequency can be minimized by close matching the circuits 120 and 122. And again, the output power of the circuit of FIG. 3 is independent of the inductance of the transformer 103. Moreover, the output power of the circuit of FIG. 3 is proportional to the CLOCK frequency, which is, in turn, proportional to the LED load voltage drop. Hence, the output current of the circuit of FIG. 3 is maintained constant regardless of the output voltage variation.

Thus, unlike conventional prior-art constant-power flyback converter, the circuit of FIG. 3 produces a constant current output independent of the timing component tolerances and load variation.

Figure 4:
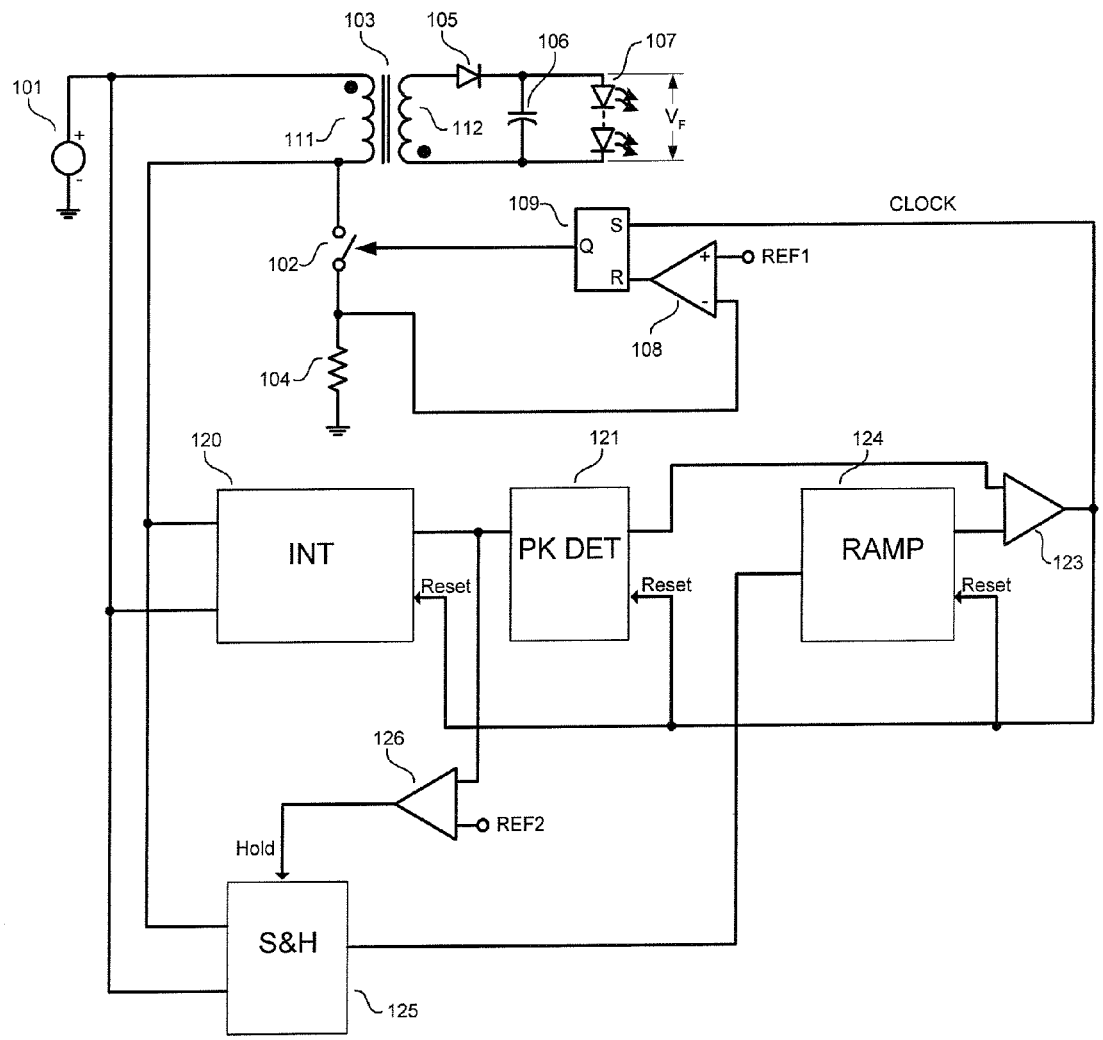
FIG. 4 shows a constant-current flyback converter of the present invention using adaptive sensing of reflected output voltage.

The circuit of FIG. 4 is yet another embodiment of the present invention wherein the blanking delay circuit 127 of FIG. 3 is made adaptive to the conduction time of the diode 105. The blanking delay 127 is replaced with a comparator 126 and a second reference REF2. Following the turn-off transition of the switch 102, the output of the integrator 120 begins ramping down. Since the slew rate of this down slope is proportional to the voltage at windings of the transformer 103, the output of the integrator 120 replicates the wave shape of the current in the secondary winding 112 and the diode 105. The S & H circuit 125 samples the voltage at the winding 111 as soon as the output of the integrator 120 falls below REF2, which event is detected by the comparator 126. The circuit of FIG. 4 guarantees that the diode 105 is in conductive state when the S & H circuit 125 samples the winding voltage, and hence this voltage is reflective of the output voltage at the LED load.

Figure 5:
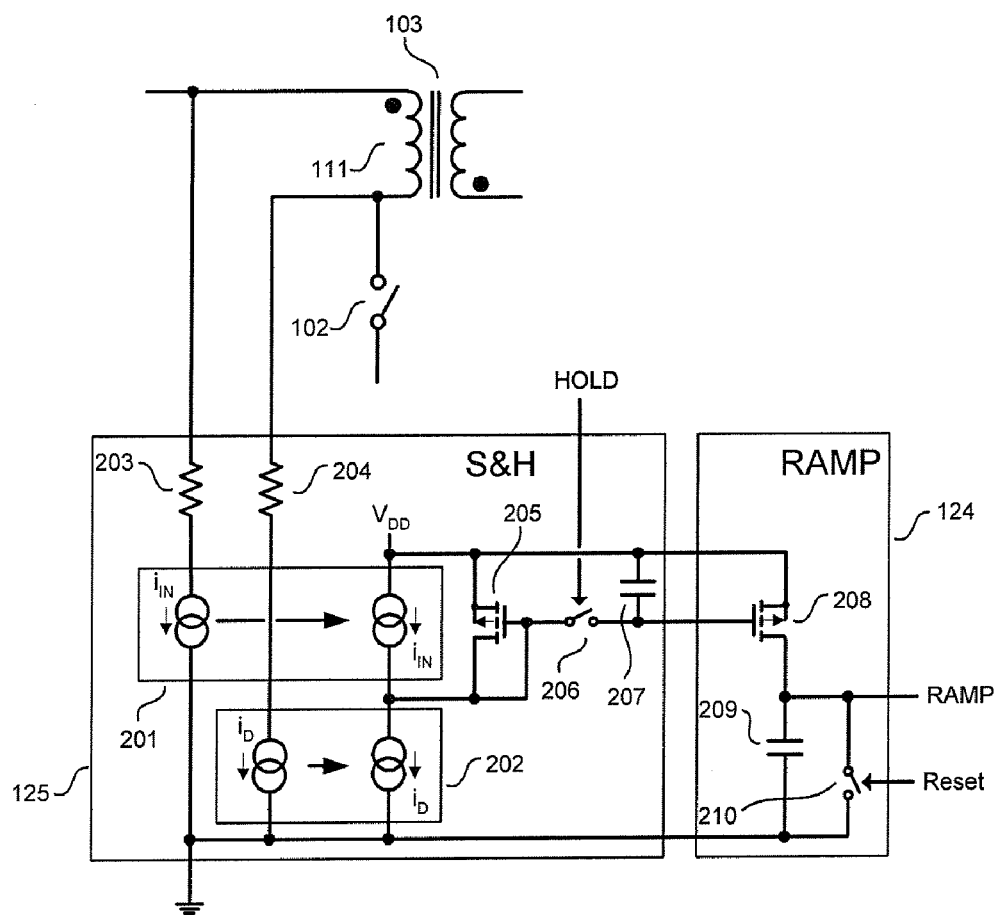
FIG. 5 shows one example of voltage sense circuit used in the converters of FIGS. 3 and 4.

FIG. 5 shows one example of the S & H circuit 125 and the ramp generator 124 utilized in the circuits of FIG. 3 and FIG. 4. The voltage at the winding 111 is sensed differentially and converted to a proportional current signal using resistors 203, 204 and current mirrors 201, 202. A sampling current mirror consisting of transistors 205 and 208, sampling switch 206 and a hold capacitor 207 samples the resulting current when the HOLD signal is received. This current generates a voltage ramp signal at a capacitor 209, whose slew rate is proportional to the corresponding voltage at the winding 111.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A switching power converter for delivering regulated power to an output load, said converter comprising:
   a power magnetic element having a primary winding for receiving electric energy from an input source, at least one secondary winding for delivering said energy to an output load, and a sense winding;
   an oscillator for generating a periodical signal; a switching means for energizing said primary winding to a reference current level each cycle of said oscillator circuit, said oscillator including:
   an integrator having an input coupled to said sense winding for deriving a time integral of the voltage at said sense winding each cycle of said oscillator;
   a peak detector holding peak value of said time integral;
   a ramp generator producing a ramp signal; and
   a comparator for comparing said peak value with said ramp signal and generating said periodical signal whenever said ramp signal meets said peak value.

2. The switching power converter of claim 1 wherein said ramp signal and said time integral are initialized with a common fixed level each cycle of said oscillator.

3. The switching power converter of claim 1 wherein said sense winding is said primary winding.

4. The switching power converter of claim 1 wherein said integrator and said ramp generator are matched with respect to each other such that the repetition rate of said periodic signal is controlled by a ratio of the slew rates of said integral and said ramp, and said repetition rate is independent of an absolute values of said integral and said ramp.

5. The switching power converter of claim 1 wherein said integrator and said ramp generator are matched with respect to each other such that said output power is independent of an inductance value of said power magnetic element and an absolute values of said integral and said ramp.

6. The switching power converter of claim 1 wherein said output load is at least one light emitting diode (LED).

7. A switching power converter for delivering regulated current to an output load, said power converter comprising:
   a power magnetic element having a primary winding for receiving electric energy from an input source, at least one secondary winding for delivering said energy to an output load, and a sense winding;
   an oscillator for generating a periodical signal;
   a switching means for energizing said primary winding to a reference current level each cycle of said oscillator circuit;
   said oscillator comprising:
   an integrator having an input coupled to said sense winding for deriving a time integral of the voltage at said sense winding;
   a peak detector holding peak value of said time integral;
   a ramp generator producing a ramp signal whose slew rate is proportional to a voltage at said sense winding at a moment of time when said secondary winding is conducting current; and
   a comparator for comparing said peak value with said ramp signal and generating said periodical signal when said ramp signal meets said peak value.

8. The switching power converter of claim 7 wherein said sense winding is said primary winding.

9. The switching power converter of claim 7 wherein said ramp signal and said time integral are initialized with a common fixed level each cycle of said oscillator.

10. The switching power converter of claim 7 wherein said integrator and said ramp generator are matched with respect to each other such that the repetition rate of said periodic signal is controlled by a ratio of the slew rates of said integral and said ramp, and said repetition rate is independent of absolute values of said integral and said ramp.

11. The switching power converter of claim 7 wherein said integrator and said ramp generator are matched with respect to each other such that said output current is independent of an inductance value of said power magnetic element and absolute values of said integral and said ramp.

12. The switching power converter of claim 7 wherein said output load is at least one light emitting diode (LED).

13. A method of regulating output power in a switching power converter comprising a magnetic element and a switching means, said magnetic element having at least one primary winding, at least one secondary winding and a sense winding, said switching means alternately connecting said primary windings for receiving electric energy from an input voltage source and said secondary windings for delivering said electric energy to an output load, said method including:
   taking the integral of voltage at said sense winding while said magnetic element is receiving electric energy from said input voltage source;
   deriving a peak value of said integral;
   controlling switching frequency of said switching means inverse proportionally to said peak value;

initializing said integral with an initial level each switching cycle of said switching means.

14. The method of claim 13 wherein said sense winding is said at least one primary winding.

15. The method of claim 13 wherein said output load is at least one light emitting diode (LED).

16. A method of regulating output current in a switching power converter comprising a magnetic element and a switching means, said magnetic element having at least one primary winding, at least one secondary winding and a sense winding, said switching means alternately connecting said primary windings for receiving electric energy from an input voltage source and said secondary windings for delivering said electric energy to an output load, said method including:

taking the integral of voltage at said sense winding while said magnetic element is receiving electric energy from said input voltage source;

deriving a peak value of said integral;

sampling reflected output voltage at said sense winding while said secondary winding is delivering electric energy to said output load, controlling switching frequency of said switching means proportionally to said reflected output voltage, controlling switching frequency of said switching means inverse proportionally to said peak value of said integral, and initializing said integral with an initial level each switching cycle of said switching means.

17. The method of claim 16 wherein said sense winding is said at least one primary winding.

18. The method of claim 16 wherein said output load is at least one light emitting diode (LED).

19. The method of claim 16 also comprising delaying said sampling of said reflected output voltage with respect to said switching means connecting said secondary windings for delivering said electric energy to said output load.

20. The method of claim 16 also comprising:

further taking said integral of voltage at said sense winding following said switching means connecting said secondary windings for delivering said electric energy to said output load;

sampling said reflected output voltage when said integral meets a reference level.

* * * * *